Dec. 23, 1958  H. T. WENDT ET AL  2,865,084
CUTTING TOOL AND INSERT CLAMPING MEANS THEREFOR
Filed April 16, 1956

*INVENTORS*
HENRY T. WENDT AND DELMER H. RHINO
BY *Jerome A. Gross*
*ATTORNEY*

United States Patent Office 2,865,084
Patented Dec. 23, 1958

2,865,084

CUTTING TOOL AND INSERT CLAMPING MEANS THEREFOR

Henry T. Wendt and Delmer H. Rhino, Hannibal, Mo., assignors to Wendt-Sonis Company, Hannibal, Mo., a corporation of Missouri Application April 16, 1956, Serial No. 578,495

1 Claim. (Cl. 29—96)

This invention relates to cutting tools of the type utilizing replaceable cutting inserts, such as those made of "cemented" carbide or ceramic-bonded materials.

Such replaceable cutting inserts, and the chip-breaker inserts used with them, may be most conveniently and economically made flat, that is, wtih carefully ground, parallel top and bottom faces. A highly desirable form for such a flat cutting insert is the square type, which can be indexed and secured in place so that several of its edges may be used successively. Because of the severe loads imposed, and the necessity of avoiding vibration, it has been difficult to clamp such cutting inserts positively and firmly, in the limited space which may be available, and to secure a chip-breaker thereon.

Some tool designers have sought to hold such flat cutting inserts with flat-surfaced clamps. Other tool designers have turned to inserts with grooved surfaces, using clamps having ridges to mate with the grooves.

A principal purpose of the present invention is to provide a replaceable insert cutting tool having a secure, compact clamp which exerts maximum force upon flat inserts, and yet permits them to be readily indexed and changed. Another purpose is to locate the clamp over an area of the inserts so far removed from the cutting edge as to permit the unimpeded flow of chips past the clamp when no chip-breaker is used; and yet permit the use of an optional replaceable chip-breaker insert, securely clamped without mechanical complication. Still further purposes will be apparent from the specification.

We achieve these purposes in a simple manner which generally permits the use of indexable cutting inserts having flat ground upper and lower surfaces, the optional chip-breaker inserts having flat upper and lower surfaces also.

Figure 1:
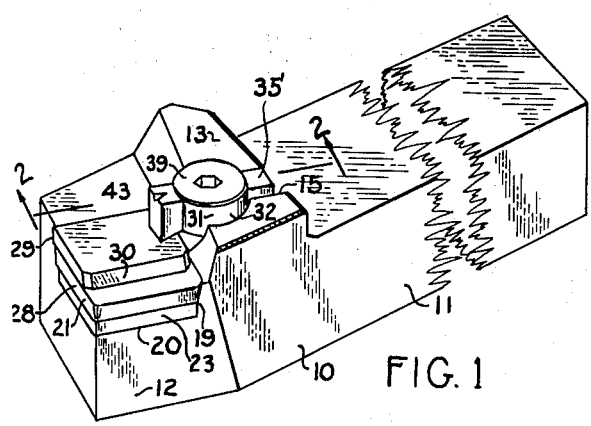
Figure 1 is a perspective view partly from above, of a cutting tool embodying the present invention.

The tool shown in Figure 1 includes a tool body generally designated 10, having a long, rectangular section shank 11 for clamping in the tool post of a lathe, screw machine, or other machine tool on which used. The tool body 10 further has a lead portion 12 and a broad upper ridge 13 extending transversely across the upper surface of the tool body 10, in effect separating the shank 11 from the tool lead portion 12, which is canted angularly to present lead angles and end angles, suitable for the cutting operation desired, and a 90° included angle between them.

Figure 4:
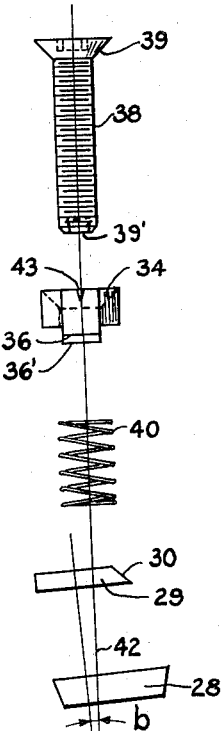
Figure 4 is a left end view of the tool shown in Figure 1, with the cutting insert and chip-breaker insert exploded in a direction perpendicular to the seat of the tool recess, and with the clamp spring, clamp and clamp screw exploded in a direction perpendicular to the base of the groove.
Figure 4:
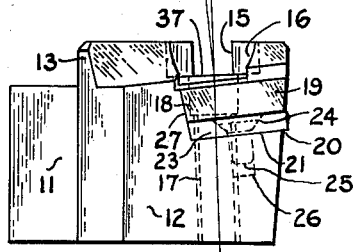

Extending across through the ridge 13 is a clamp-accommodating groove 14 which has a square cut portion 15 at the shank side, as shown in Figure 4. The angularity at which such square cut portion 14 is formed is hereinafter more fuly discussed. On the side toward the lead portion, the groove substantially broadens to provide a substantially annular area 16, to accommodate the central annular portion of a clamp hereinafter described. At the center of the annular area 16 is a threaded clamp bore 17 having a well or counterbore 18 at its upper end for receiving a clamp spring, hereinafter mentioned.

Figure 2:
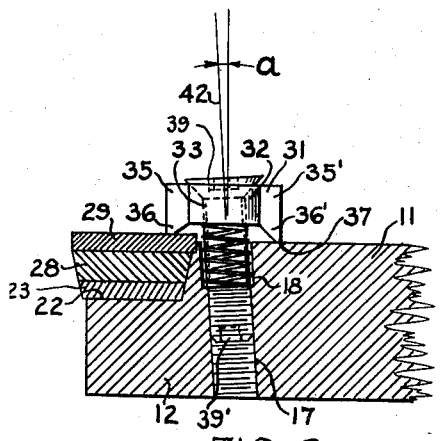
Figure 2 is a fragmentary sectional view of the tool of Figure 1, taken along line 2—2 thereof, with its clamp (shown in elevation) holding both a cutting insert and a chip-breaker insert.
Figure 3:
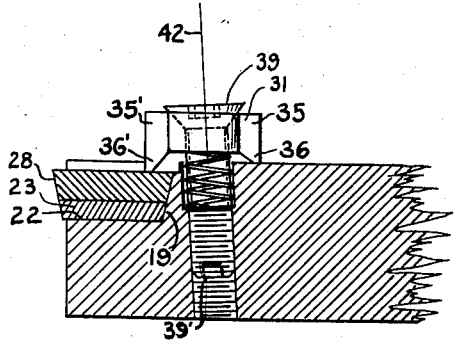
Figure 3 is a view similar to Figure 2, showing the clamp in position for holding only a cutting insert.

The lead portion 12 of the tool body 10 has a recess or pocket 19, which is open along its lead edge 20 and its end edge 21, as shown in Figures 1 and 4. The recess bottom 22, shown in Figures 2 and 3, is flat, and inclined at an angle hereinafter discussed. Preferably the recess bottom 22 is fitted with a replaceable, cemented carbide shim 23, having flat, parallel upper and lower surfaces, its upper surface serving as a base against which a replaceable cutting insert is fitted as hereinafter described. The shim 23 has a centrally located tapered countersink 24, against which bears the head of a taper-headed shim screw 25, secured within a tapped bore 26 in the tool body lead portion 12. If the shim 23 was dispensed with (and the shim screw 25 also), the recess bottom 22 would be located at the level shown in the drawings for the upper surface of the shim 23.

Opposite the lead edge 20 of the recess 19 is a thrust-resisting recess wall 27, shown edgewise in Figure 4, which makes an angle greater than 90° with the recess bottom 22, the excess over 90° being equal to the edge angle of the cutting insert to be accommodated therein. The recess 19 has another wall on the side opposite the recess end edge 21, which wall may be similarly sloped as a matter of fit.

The tool body 10 may be made to provide such tool geometry as is necessary for the particular use. The figures show a tool having positive top rake, that is, with an upper surface sloping away from the cutting edge. Using a replaceable flat insert in such a positive top rake tool, the angularity of the insert cutting edges must be greater than 90° by the sum of the top rake angle and the clearance angle. Consequently, a positive rake indexable square insert yields four cutting edges. Inserts for negative top rake tools may have edge angles equal to 90°, thus yielding eight cutting edges per square insert.

The cutting insert 28 shown in the drawings, formed preferably of cemented carbide or one of the ceramic bonded materials which is suited for use with cutting tools, has flat, ground, parallel top and bottom surfaces, with its upper surface larger than its lower surface and each of the side edges therebetween sloping, at a uniform angle sufficient to provide a desired clearance angle when in position to provide positive top rake. The angularity necessary for combined clearance and positive top rake will determine the slope of the thrust-resisting recess wall 27.

The angular cant of the tool lead portion 12 makes it possible to utilize a square insert such as the insert 28 and still provide necessary lead and end angles for proper operation of the tool. It is to be understood, however, that other shapes of inserts, such as triangular inserts, could also be used without departing from the present invention.

For optional use, there may be mounted on top of the upper surface of the cutting insert 28 a replaceable chip-breaker insert 29, preferably formed of similar material and having a forward edge 30 sloping at approximately 45° for rolling chips of material away from the top surface of the cutting insert 28 and breaking them to provide better chip control. Like the cutting insert 28, the chip-breaker insert 29 has parallel flat top and bottom surfaces.

Adapted to fit over the recess 19 at a point removed from the forward edge 30 of the chip-breaker insert 29, is a bridging clamp generally designated 31, forged of strong, tough steel, having a preferably annular body portion 32 formed with reference to an axial bore 33, shown in dashed lines in Figures 2 and 3, and equipped with an upper countersink 34; the clamp 31 further comprising a pair of integral opposite clamps wings 35, 35' terminating at their lower ends in outward-tapering clamp dogs 36, 36' of unequal length, the inequality being preferably one-half the thickness of the chip-breaker insert 29. The taper of the clamp dogs 36, 36' causes them to present only narrow outer edge surfaces for bearing against the chip-breaker insert 29 (when in place as shown in Figures 1 and 2) on the one side, and against the bottom or bearing surface 37 of the square cut groove portion 15 on the other. The angular relationship of the said bearing surface 37 to the upper surface of the cutting insert 28 and chip-breaker insert 29 will be described subsequently.

The annular body portion 32 of the bridging clamp 31 is presented spacedly above the substantially annular area 16 on the tool body within the upper ridge 13; and the walls of the square cut portion 15 of the clamp-accommodating groove 14 fit fairly closely about the outwardly-extending clamp wing 35' as shown in Figures 1 and 2, so as to prevent turning of the clamp 31 about a clamp screw 38. The clamp screw 38 is a special screw; it has a wide-projecting tapered upper head 39 bearing within and upon the bridging clamp countersink 34; also a lower end wrenching socket 39' for use when the tool is mounted inverted.

The unequal length of the clamp dogs 36, 36' makes it possible to dispense optionally with the chip-breaker insert 29. Thus in Figure 3 the bridging clamp 31 is reversed from the position shown in Figure 2, so that the clamp dog 35' bears directly upon the upper surface of the cutting insert 28 and the clamp dog 36 against the bearing surface 37 within the square cut groove portion 15.

Around the clamp screw 38 beneath the clamp annular body portion 32 is a helical compression spring 40, accommodated at its lower end within the well or counterbore 18. When the clamp screw 38 is screwed outward, to permit the bridging clamp 31 to be raised and its position reversed, the spring 40 holds the clamp 31 upward against the clamp screw head 39. The operator can thus add or remove the chip-breaker insert, turn the cutting insert to utilize a new edge, and perform other necessary operations, the spring 40 serving to hold the clamp 31 upward against the screw head 39 and resist unintended turning.

The clamp screw 38 is adjustably secured within a tapped bore 41, whose screw axis 42 departs somewhat from perpendicular to the bearing surface 37. Taking a center-line through the square cut groove portion 15 in the plane of the bearing surface 37, the screw axis 42 is inclined along such center-line toward the recess 19, away from perpendicular an amount from about 1° to 4°, preferably 2°, such angle of inclination toward the recess being designated $a$ in Figure 2. When the square cut groove portion 15 is viewed from the end of the tool, as shown in Figure 4, the screw axis 42 will be seen to be substantially perpendicular to the bearing surface 37 which forms the groove bottom; however, the recess bottom 22 (and therefore the flat upper and lower surfaces of the cutting insert 28 and chip-breaker insert 29) is not perpendicular to the screw axis 42 as so viewed. Inasmuch as the slope of the recess bottom 22 is fixed by the desired top rake angle, the bearing surface 37, in the end view as shown in Figure 4, may be considered as being inclined downwardly on the side near the recess lead edge 20 by an angle $b$ within the range of from about 1° to 4°, preferably 2°.

The general effect of the relative inclinations of the parts may be described as concentrating the clamping with utmost intensity upon whichever clamp dog 36, 36' is presented over the recess 19, and at a point nearest the recess lead edge 20. This has been found to be of tremendous practical importance. Theoretical considerations, which at least partly bear out this result, are as follows:

Since the tapered head 39 of the clamp screw 38 projects radially outward from the screw axis 42 and is tilted with respect to the upper countersink 34 in the bridging clamp 31, the center of bearing forces exerted on the bridging clamp 31 will be displaced from the screw axis 42 toward the recess 19. Thus whichever of the clamp dogs 36, 36' is presented over the recess 19 will react the greater portion of the clamping force exerted by the screw 38. Likewise, due to the angle $b$ between the bearing surface 37 and the recess bottom 22, this greater portion of the clamping force will be concentrated on that point of such clamp dog which is nearer the lead edge 20 of the recess 19. Tightening of the clamp screw 38 will take out all "play" and concentrate the strength of the clamp 31 in substantially point contact, either on the upper surface of the chip-breaker insert 29, where used as shown in Figures 1 and 2, or on the upper surface of the cutting insert 28 if the chip-breaker insert 29 is dispensed with as shown in Figure 3. The inserts 28, 29 are held so tightly as to seem to be "nailed" in place by such point contact.

The span of the bridging clamp 31 is the entire diameter of the annular body portion 32 plus the combined length of the opposed clamp wings 35, 35'. The clamp dogs 36, 36' raise the clamp 31 to bridge between such inserts as are used and the bearing surface 37. Thus without spoiling the clamping effect, the annular area 16 around the clamp screw 38 may be interrupted and provided with the well 18 for the spring 40, or with some other suitable accessory.

A marking indentation 43 is provided in the upper surface of the clamp wing 35 having the shorter dog 36, to indicate the proper positioning of the clamp wherever a chip-breaker insert 29 is to be used.

For best results the level of the bearing surface 37 should be approximately half the chip-breaker thickness above that portion of the upper surface of the cutting insert 28 against which the clamp 31 is to fit. However, the bridging clamp 31 is somewhat self-correcting in positioning itself; the clamping force exerted downward by the tapered head 39 of the clamp screw 38 will divide the clamping force between the bearing surface 37 and the inserts within the recess 19 (with the greatest portion of the clamping force on the inserts) regardless of minor misalignment or surface deviations.

The thrust-resisting recess wall 27 intensifies the clamping force upon the cutting insert 28 in the following manner: the aft-thrust exerted against the edge of the insert 28 presented for cutting, is reacted by the thrust-resisting recess wall 27, which, by virtue of its slope, acts cam-like to give an upthrust to the rear portion of the cutting insert 28. This upthrust is reacted by an increased downward force exerted by the bridging clamp 31. Thus, use of the cutting tool will be found to tighten the clamping force, rather than loosen it.

By the means herein disclosed, tight clamping is obtained equivalent in rigidity to a one-piece tool. The fact that the clamp exerts a concentrated force allows it to be located at a convenient point sufficiently far removed from the cutting edge to permit unimpeded flow of chips when no chip-breaker insert is used and yet permit the use of a replaceable chip-breaker insert clamped by the very same clamp means. The flat upper and lower surfaces of the cutting insert 28 and the chip-breaker insert 29 cooperate with the clamp mechanism here shown to secure a more intense clamping force than has been heretofore thought possible; yet such inserts are less expensive and more perfect than inserts of the grooved type.

The construction shown provides an extra margin of clamp security over that which may be necessary for some uses. Various modifications will occur to those familiar with cutting tools. Some such modifications may sacrifice certain advantages of the construction shown, but yet be well suited for specific applications. Triangular inserts may be used, and also shapes not capable of being indexed. The present invention may be embodied in tools characterized by neutral or negative top rake, and with square inserts having eight cutting edges, although with the latter, added clamping effect of the up-sloping recess wall 27 may be sacrificed. Thus this invention is not to be considered narrowly, but as fully co-extensive with the scope of the claim which follows.

We claim:

In a cutting tool of the type utilizing a flat, parallel-surfaced, replaceable cutting insert, the improvement comprising means for using optionally a flat, parallel-surfaced chip-breaker insert thereon, comprising a tool body having a recess within which such cutting insert and chip-breaker insert may be accommodated, a bearing surface on the tool body at a level substantially intermediate the depth of such chip-breaker insert when in place within the recess, together with a bridging clamp including two spaced, downwardly-presented force-concentrating projections of unequal length, their inequality being approximately half the thickness of such chip-breaker insert, the span of the clamp between said projections extending from over the tool body recess to over the tool body bearing surface, and means intermediate said clamp projections whereby to secure the clamp with the shorter projection exerting a clamping force against the upper surface of such chip-breaker insert and the longer projection bearing against the bearing surface of the tool body, said bridging clamp being reversible so that when such chip-breaker insert is removed, the longer clamp projection may be brought to bear against the upper surface of such cutting insert and the shorter projection against the tool body bearing surface.

References Cited in the file of this patent

UNITED STATES PATENTS

| | | |
|---|---|---|
| 1,376,077 | Cadwallader | Apr. 26, 1921 |
| 1,776,335 | Rauzieres | Sept. 23, 1930 |
| 2,063,128 | Severson | Dec. 8, 1936 |
| 2,181,023 | Moore | Nov. 21, 1939 |
| 2,392,285 | Gauthier | Jan. 1, 1946 |
| 2,619,010 | Mathison | Nov. 25, 1952 |
| 2,675,604 | Plummer | Apr. 20, 1954 |
| 2,690,609 | Greenleaf | Oct. 5, 1954 |
| 2,725,793 | Gamura | Dec. 6, 1955 |
| 2,734,256 | Forward | Feb. 14, 1956 |
| 2,799,079 | Brigner | July 16, 1957 |

FOREIGN PATENTS

| | | |
|---|---|---|
| 968,404 | France | Nov. 27, 1950 |
| 989,307 | France | May 23, 1951 |
| 1,025,299 | France | Jan. 21, 1953 |

OTHER REFERENCES

Bulletin No. 552 M, by Wesson Co., 1220 Woodward Hgts. Blvd., Ferndale 20, Mich. (Received in the Patent Office Apr. 25, 1955).

Article, Development in Tools with Tungsten-Carbide "Throw-away" Tips From Machinery, Nov. 18, 1955, vol. 87, pages 1199–1203.